(12) United States Patent
Narayanan et al.

(10) Patent No.: US 10,568,267 B2
(45) Date of Patent: Feb. 25, 2020

(54) HARVESTER SEPARATION FRAME ORIENTATION ADJUSTMENT

(71) Applicant: Deere and Company, Moline, IL (US)

(72) Inventors: Karthikeyan Narayanan, Vembakkam (IN); James K. Adamson, Colona, IL (US); Kevin P. Hurley, Davenport, IA (US); Volker Fuchs, Bettendorf, IA (US)

(73) Assignee: Deere & Company, Moline, IL (US)

( * ) Notice: Subject to any disclaimer, the term of this patent is extended or adjusted under 35 U.S.C. 154(b) by 144 days.

(21) Appl. No.: 15/844,522

(22) Filed: Dec. 16, 2017

(65) Prior Publication Data
US 2019/0183053 A1 Jun. 20, 2019

(51) Int. Cl.
*A01D 75/28* (2006.01)
*A01F 12/44* (2006.01)
*A01F 12/30* (2006.01)
*A01F 12/32* (2006.01)

(52) U.S. Cl.
CPC .......... *A01D 75/282* (2013.01); *A01F 12/305* (2013.01); *A01F 12/32* (2013.01); *A01F 12/448* (2013.01)

(58) Field of Classification Search
CPC ........ A01F 12/448; A01F 12/32; A01F 12/38; A01F 12/44; A01F 12/56; A01F 12/00; A01F 12/30; A01F 12/305; A01D 75/282; A01D 41/12; A01D 41/1276
See application file for complete search history.

(56) References Cited

U.S. PATENT DOCUMENTS

| | | | | |
|---|---|---|---|---|
| 2,351,567 A | * | 6/1944 | Welty | A01F 12/00 460/100 |
| 4,344,443 A | | 8/1982 | De Busscher et al. | |
| 4,548,214 A | * | 10/1985 | Sheehan | A01D 75/282 460/9 |
| 4,557,276 A | * | 12/1985 | Hyman | A01D 75/285 209/416 |
| 6,672,957 B2 | * | 1/2004 | Voss | A01F 12/448 460/101 |

(Continued)

FOREIGN PATENT DOCUMENTS

| | | |
|---|---|---|
| EP | 2936967 A1 | 10/2015 |
| GB | 2052238 A | 1/1981 |

(Continued)

OTHER PUBLICATIONS

European Search Report issued in counterpart European Patent Application No. 18211634.3 dated Apr. 12, 2019 (8 pages).

*Primary Examiner* — Arpad Fabian-Kovacs
(74) *Attorney, Agent, or Firm* — Rathe Lindenbaum LLP

(57) ABSTRACT

A harvester may include a chassis, a first separation frame movably supported by the chassis and upon which crop material is deposited, a second separation frame movably supported by the chassis and upon which the crop material is deposited; a reciprocating drive operably coupled to the separation frame to reciprocate the separation frame and an adjustable link operably coupled between the separation frame and the chassis. The adjustable link facilitates adjustment of an orientation of the first separation frame independent of an orientation of the second separation frame without altering a reciprocation stroke distance.

20 Claims, 14 Drawing Sheets

(56) References Cited

U.S. PATENT DOCUMENTS

| | | | | |
|---|---|---|---|---|
| 7,322,882 B2* | 1/2008 | Duquesne | ............ | A01D 75/282 |
| | | | | 209/233 |
| 7,553,226 B2* | 6/2009 | Dhont | ................... | A01D 75/282 |
| | | | | 460/101 |
| 8,777,706 B2* | 7/2014 | Farley | .................. | A01D 75/282 |
| | | | | 460/101 |
| 9,226,450 B2* | 1/2016 | Pearson | .................. | A01F 12/34 |
| 9,258,945 B2* | 2/2016 | Pearson | ................ | A01F 12/446 |
| 9,414,546 B2* | 8/2016 | Missotten | ............... | A01D 41/12 |
| 9,693,506 B2* | 7/2017 | De Smet | ................. | A01F 12/32 |
| 9,844,186 B2* | 12/2017 | Walter | .................... | A01D 41/12 |
| 10,034,430 B2* | 7/2018 | Missotten | ............... | A01F 12/38 |
| 2003/0186731 A1* | 10/2003 | Voss | ....................... | A01F 12/448 |
| | | | | 460/101 |
| 2005/0282601 A1* | 12/2005 | Duquesne | ............ | A01D 75/282 |
| | | | | 460/101 |
| 2007/0123326 A1 | 5/2007 | MacKin et al. | | |
| 2008/0318650 A1* | 12/2008 | Dhont | ................. | A01D 75/282 |
| | | | | 460/101 |
| 2016/0029562 A1* | 2/2016 | De Smet | ................ | A01F 12/32 |
| | | | | 460/1 |
| 2017/0020071 A1* | 1/2017 | Reinecke | .............. | A01F 12/446 |
| 2017/0020074 A1* | 1/2017 | Reinecke | .............. | A01F 12/448 |

FOREIGN PATENT DOCUMENTS

| | | |
|---|---|---|
| JP | H07298770 A | 11/1995 |
| WO | 2014139988 A1 | 9/2014 |

* cited by examiner

HARVESTER SEPARATION FRAME ORIENTATION ADJUSTMENT

BACKGROUND

Harvesters are used to gather a crop. Many harvesters utilize a cleaning shoe to separate grain or other wanted portions of a crop from chaff or other unwanted portions of the crop, referred to as material other than grain (MOG). The cleaning shoe may include several separation frames that facilitate the separation of grain from MOG. The separation frames may include an imperforate floor that forms a pan or filtering elements, such as louvers, that form chaffers or sieves. The separation frames along with their support separation elements may be reciprocated to assist in such separation of grain from MOG.

Figure 1:
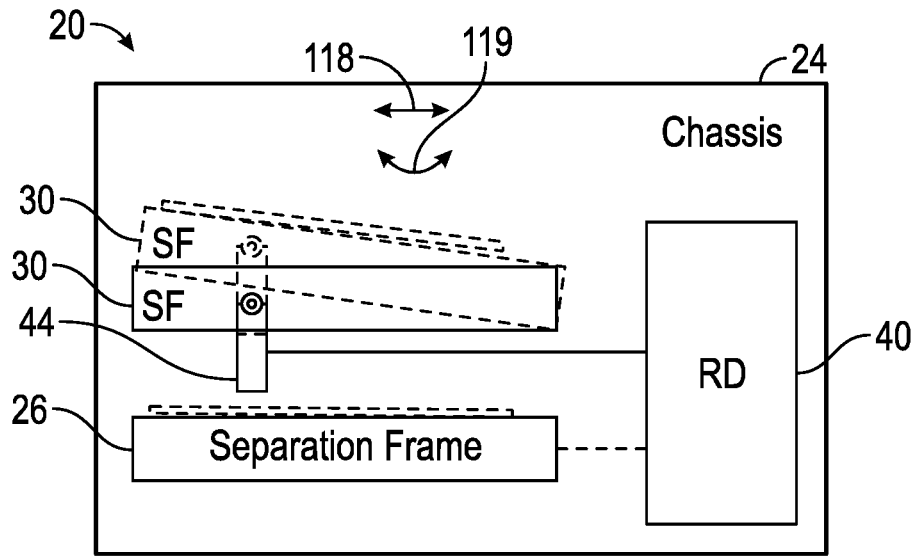
FIG. 1 is a schematic diagram of an example harvester having an example separation frame with an adjustable orientation.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

When harvesting a crop, a harvester may traverse an uneven terrain or field. For example, harvester may be going uphill or downhill as it traverses a field. In some circumstances, the harvester may be going along a side of a hill. The nonlevel orientation of the harvester, whether going up or down a hill or alongside a hill, may result in uneven distribution of crop flow through the harvester and uneven loading of crop onto the separation frames, such as onto the pans, chaffers or sieves.

Disclosed herein are example harvesters that have separation frames that have an adjustable orientation to accommodate a nonlevel orientation of the harvester, such as when the harvester is going up or down a hill or alongside a hill. The example harvesters may adjust the orientation of one separation frame relative to the orientation of another separation frame. The example harvesters may adjust the orientation of a separation frame without altering a reciprocation stroke distance of the separation frame. In other words, although the orientation at which a separation frame extends may be adjusted, the distance by which the separation frame is reciprocated remains the same.

Throughout this disclosure, separation frames are described as having an adjustable orientation. The "adjustable orientation" refers to the orientation of the plane containing or along which the major dimensions of the separation frame extend, such as the length and width of the separation frame, wherein the thickness of the separation frame may be considered a minor dimension. In some implementations, the separation frame may carry louvers which themselves are rotatable between various positions. In such implementations, the louvers may be rotatable or may have adjustable orientations relative to the separation frame supporting the louvers, wherein the separation frame incorporating the louvers also has an adjustable orientation. In some circumstances, the orientation of the separation frame may be adjusted while the orientation of the louvers relative to the frame remain the same. In some circumstances, the orientation of separation frame and the orientation of the louvers relative to the frame may be concurrently adjusted.

In some implementations, the example harvesters adjust the orientation of at least one separation frame in response to commands provided by an operator of the harvester. In yet other implementations, the example harvesters may include sensors that sense the orientation of the harvester, wherein the orientation of at least one separation frame is automatically adjusted based upon the sensed orientation of the harvester. In yet other implementations, the example harvester may include sensors that sense the flow of crops on to a separation frame or from one separation frame to another separation frame, wherein upon sensing and uneven crop flow or uneven loading of crop onto a separation frame, the harvester automatically adjusts the orientation of at least one separation frame. In some implementations, the automatic adjustment of the orientation of at least one separation frame may be based upon a combination of signals indicating the orientation of the harvester (including distinct portions of the harvester) and signals indicating an uneven or nonuniform crop flow through the harvester. In some implementations, the adjustment may not be automatic, but may be in response to commands provided by an operator who receives information from sensors indicating the orientation of the harvester and/or uneven crop flow through the harvester.

Disclosed is an example harvester that comprises a chassis, a first separation frame movably supported by the chassis and upon which crop material is deposited, a second separation frame movably supported by the chassis and upon which the crop material is deposited; a reciprocating drive operably coupled to the separation frame to reciprocate the separation frame and an adjustable link operably coupled between the separation frame and the chassis. The adjustable link facilitates adjustment of an orientation of the first separation frame independent of an orientation of the second separation frame without altering a reciprocation stroke distance.

FIG. 1 is a schematic diagram of an example harvester 20. Harvester 20 has a separation frame that has an adjustable orientation to accommodate a nonlevel orientation of the harvester, such as when the harvester is going up or down a hill or alongside a hill. Harvester 20 may further adjust the orientation of its separation frame relative to the orientation of another separation frame. Harvester 20 may adjust the orientation of a separation frame without altering a reciprocation stroke distance of the separation frame. In other words, although the orientation at which a separation frame extends may be adjusted, the distance by which the separation frame is reciprocated remains the same. Harvester 20 comprises chassis 24, separation frame 26, separation frame 30, reciprocating drive 40 and adjustable link 44.

Chassis 24 comprises the base frame of harvester 20. Chassis 24 may comprise multiple brackets, plates and the like upon which the various components of harvester 20 are supported and mounted. Jesse 24 may have a variety of sizes, shapes and configurations depending upon particulars of harvester 20.

Separation frame 26 comprises a frame or panel that facilitates the separation of grain from MOG. In one implementation, separation frame 26 comprises or supports an imperforate floor so as to form a pan. In another implementation, separation frame 26 comprises or supports filtering elements through which grain may pass but MOG of a predefined characteristic or size may not pass. In one implementation, the filtering elements may comprise louvers, wherein grain may pass between it the louvers and wherein MOG may not pass through the louvers, the MOG being blown and discharged from the harvester.

Separation frame 26 is movably supported by chassis 24. In one implementation, separation frame 26 is movably supported such that it may be reciprocated back-and-forth by reciprocating drive 40. In one implementation, separation frame 26 may be additionally movable such that it orientation or levelness relative to chassis 24 may be adjusted.

Separation frame 30 is similar to separation frame 26. Separation frame 30 comprises a frame that facilitates the separation of grain from MOG. In one implementation, separation frame 30 comprises or supports an imperforate floor so as to form a pan. In another implementation, separation frame 30 comprises or supports filtering elements through which grain may pass but MOG of a predefined characteristic or size may not pass. In one implementation, the filtering elements may comprise louvers, which may or may not be adjustable relative to the separation frame, wherein grain may pass between the louvers and wherein MOG may not pass through the louvers, the MOG being blown and discharged from the harvester.

Separation frame 30 is movably supported by chassis 24. Separation frame 30 is movably supported such that it may be reciprocated back-and-forth by reciprocating drive 40. Separation frame 26 is additionally movable such that it orientation or levelness relative to chassis 24 may be adjusted.

Reciprocating drive (RD) 40 comprises a drive mechanism operably coupled to separation frame 30 so as to reciprocate separation frame 30. Reciprocating drive 40 comprises a source of power, such as an internal combustion engine of harvester 20 or a source of electrical power comes such as a battery. Reciprocating drive 40 may comprise a hydraulic or pneumatic system driven by the source of power, wherein power is delivered hydraulically to drive in reciprocate separation frame 30. Reciprocating drive 40 may comprise a driveshaft which is rotationally driven by the source of power, wherein motion of the driveshaft is converted by cams, linkages, swing arms and the like for reciprocating separation frame 30. In the example illustrated, reciprocating drive 40 is additionally operably coupled to separation frame 26 so as to also reciprocate separation frame 26. In other implementations, separation frame 26 may have its own dedicated reciprocating drive 40 or may utilize a reciprocating drive that shares components with reciprocating drive 40.

Adjustable link 44 comprises at least one link operably coupled between chassis 24 and separation frame 30. Adjustable link 44 is connected to a pivot point of separation frame 30. Adjustable link 44 has an adjustable length so as to adjust the location of the pivot point so as to alter the orientation or levelness of separation frame 30 relative to chassis 24 and relative to separation frame 26. Adjustable link 44 is located such that changes to the length of adjustable link 44 allow the orientation of separation frame 30 to be adjusted independent of the orientation of separation frame 26 and without altering the reciprocation stroke distance, the distance by which separation frame 30 is reciprocated back-and-forth during a cycle or single revolution.

In one implementation, adjustable link 44 has an adjustable length such that the fore-aft orientation of separation frame 30 is adjustable. For example, when harvester 20 is going uphill, adjustable link 44 may be adjusted such that the orientation of separation frame 30 is not level, but is tilted downwardly in a forward direction. When harvester 20 going downhill, adjustable link may be adjusted such that the orientation of separation frame 30 is not level, but is tilted upwardly in a forward direction. In one implementation, adjustable link has an adjustable length such that the transverse orientation of separation frame 30 is adjustable. For example, when harvester 20 is traversing along the side of a hill sloping downward to the left, adjustable link may be adjusted such that the orientation of separation frame 30 is not level, but is tilted downwardly to the right. Conversely, when harvester 20 is traversing along the side of a hill sloping downward to the right, adjustable link may be adjusted such that the orientation of separation frame 30 is not level, but is tilted downwardly to the left. In some implementations, adjustable link 44 may comprise multiple such links at various locations such that the length of the adjustable lengths of the various links may be adjusted relative to one another to adjust the orientation of separation frame 30 in both the fore-aft direction and the transverse direction.

Figure 2:
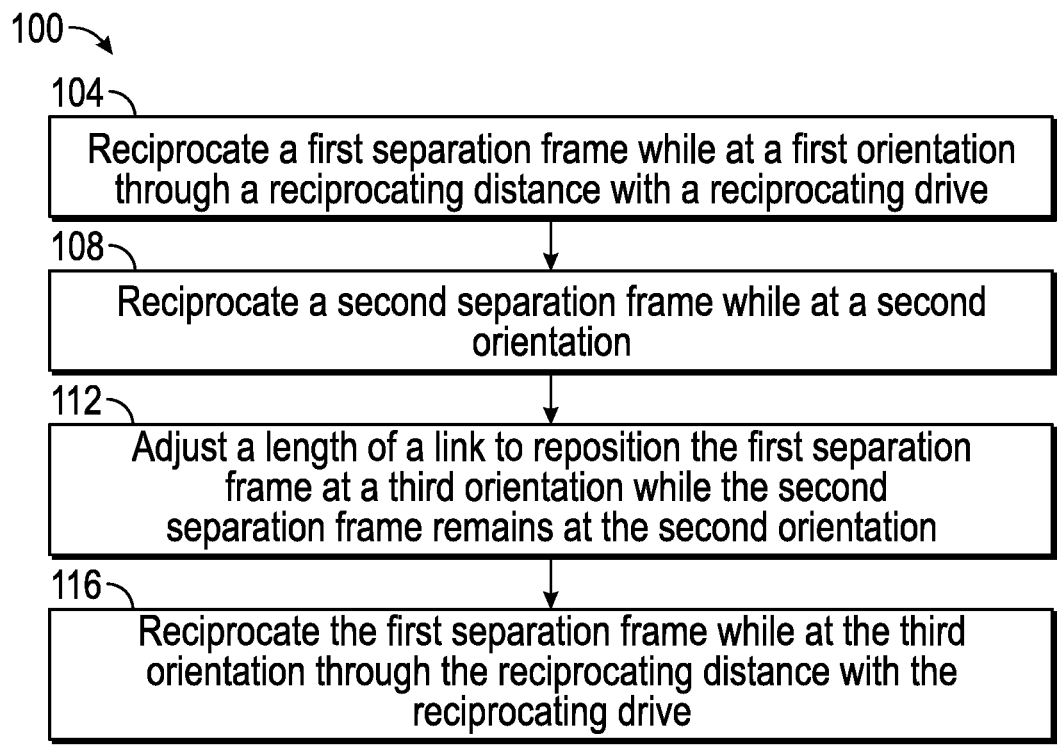
FIG. 2 is a flow diagram of an example method for separating grain from MOG using a separation frame with an adjustable orientation.

FIG. 2 is a flow diagram of an example method 100 for separating grain from MOG. Method 100 adjusts the orientation of a separation frame to accommodate times when a harvester may be traversing an uneven terrain. Method 100 facilitates more even loading of crop in the harvester.

Although method 100 is described in the context of being carried out with harvester 20, it should be appreciated that method 100 may likewise be carried out with any of the example harvester described hereafter or with other similar harvesters having adjustable links.

As indicated by block 104, a first separation frame, separation frame 30, is reciprocated while at a first orientation through a reciprocating distance with a reciprocating drive, that is reciprocating drive 40. As indicated by block 108, a second separation frame, such as separation frame 26, is reciprocated while at a second orientation. In one implementation, the separation frame is reciprocated by a shared reciprocating drive. In other implementations, the two separation frames are reciprocated by distinct reciprocating drives.

As indicated by block 112, the length of a link, such as adjustable link 44, is adjusted to reposition the first separation frame (separation frame 30) at a third orientation while the second separation frame (separation frame 26) remains at its second orientation. For example, as shown by 1, the length of adjustable link 44 may be changed from the first length shown in solid lines to the second length shown in broken lines, adjusting the orientation of separation frame 30 from the first orientation shown in solid lines to the second orientation shown in broken lines. In one implementation, the adjustment of the link is carried out with a powered actuator in response to electrical signals. For example, in one implementation, a powered actuator, such as a pneumatic or hydraulic cylinder-piston assembly, may be utilized to adjust a length of the link. In some implementations, the powered actuator may itself form the adjustable link.

In some implementations, the adjustment of the length of the link is carried out automatically in response to value sensed by at least one sensor. For example, in one implementation, the adjustment of the length of the link is carried out automatically in response to signals from at least one sensor indicating an orientation or levelness of the harvester or the terrain over which the harvester traverses. In one implementation, the adjustment of the length of the link is carried out automatically in response to or based upon signals from at least one sensor indicating crop flow (grain and/or MOF) being deposited upon the first separation frame, passing through the first separation frame or being deposited upon the second separation frame.

As indicated by block 116, the first separation frame is reciprocated while at the third orientation through the reciprocating distance with the reciprocating drive. The reciprocating distance is the same as the reciprocating distance through which the first separation frame with reciprocated while at the first orientation. In one implementation, such reciprocation may be linear as indicated by arrows 118. In another implementation, such reciprocation may be along an oval or curved path as indicated by arrows 119.

Figure 3:
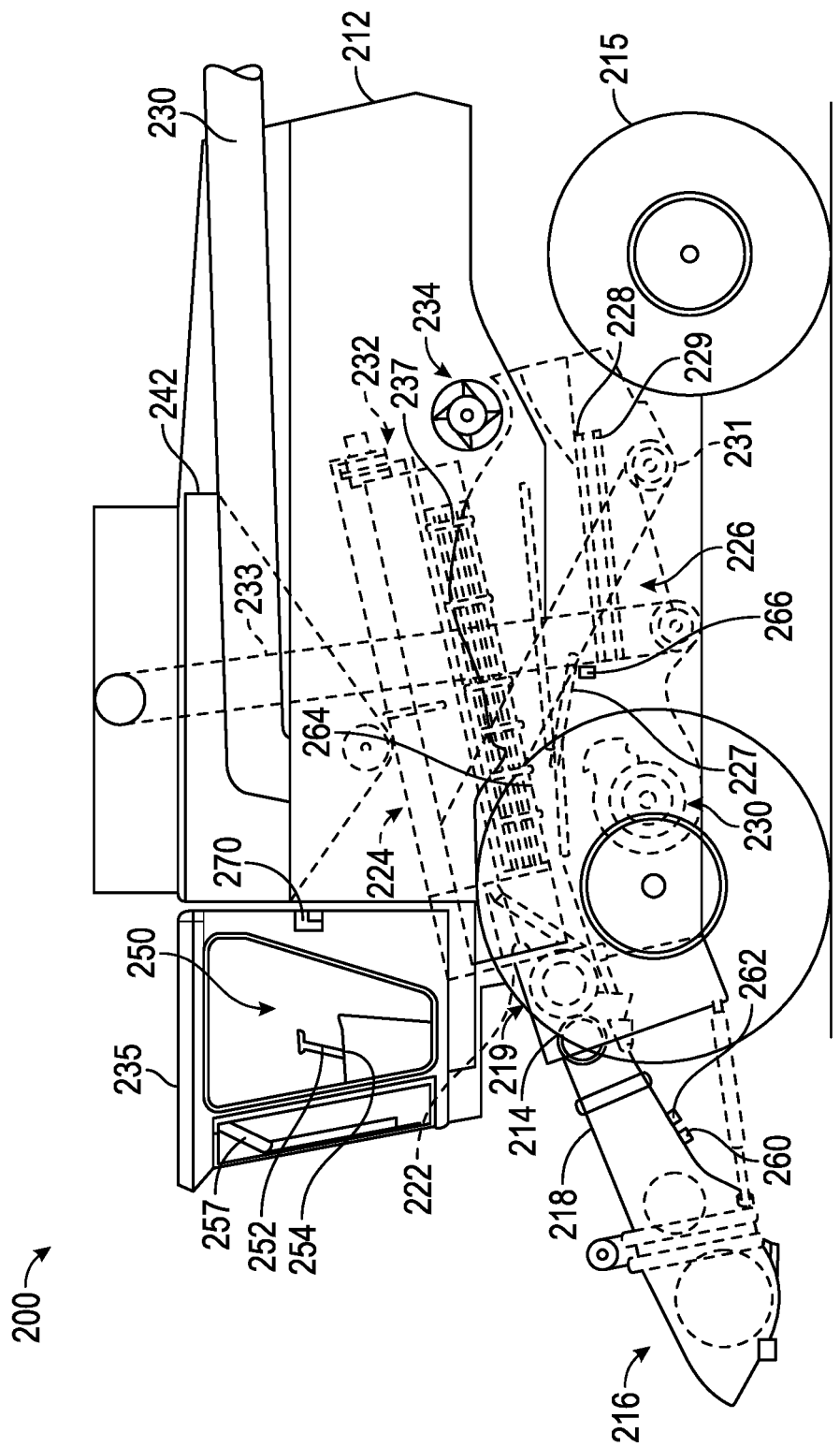
FIG. 3 is a side view of portions of an example harvester.

FIG. 3 illustrates an example harvester 200, an example implementation of harvester 20 described above. Harvester 200 comprises a main frame or chassis 212 having wheel structure including front and rear ground engaging wheels 214 and 215 supporting the chassis for forward movement over a field of crop to be harvested. The front wheels 214 are driven by an electronically controlled hydrostatic transmission.

A vertically adjustable header or harvesting platform 216 is used for harvesting a crop and directing it to a feeder house 218. In one implementation, harvesting platform 216 may comprise row units for guiding and directing crops planted in rows, such as corn. In one implementation, harvesting platform 216 may comprise reels that gather the crops being harvested. In some implementations, harvesting platform 216 may comprise at least one draper belt that further assist in moving the crop being gathered.

The feeder house 218 is pivotally connected to the chassis 212 and includes a conveyor for conveying the harvested crop to a beater 219. The beater 219 directs the crop upwardly through an inlet transition section 222 to a rotary threshing and separating assembly 224. In other implementations, other orientations and types of threshing structures may be utilized. For example, assembly 224 may comprise a transverse rotor and concave in combination with straw walkers.

The rotary threshing and separating assembly 224 threshes and separates the harvested crop material. The harvested crop material is interacted upon by a rotor 237 rotates opposite to a concave 225. Grain and chaff fall through separation grates of concave 225 to a cleaning system 226, portions of which are shown. The grain and chaff are transported along various reciprocating separation frames including a step pan 227, a chaffer 228 and a sieve 229. As will be described in more detail hereafter with respect to FIG. 4 et seq., step pan 227 is similar to separation frame 30 described above in that step pan 227 is operably coupled to an adjustable link that facilitates adjustment of an orientation of step pan 227 relative to the orientation of chassis 212, chaffer 228 and sieve 229, independent of the orientation of chassis 212, chaffer 228 and sieve 229, without altering a reciprocation stroke distance of step pan 227.

An air fan 230 directs air across and through the various reciprocating separation frames such that less dense or lighter chaff blown to a rear of harvester 24 being discharged. The cleaning system 226 removes the chaff and directs the clean grain to elevator 233. Clean grain elevator 233 conveys the grain to grain tank 242. The clean grain in the tank 242 can be unloaded into a grain cart or truck by unloading auger 230. Tailings fall into the return elevator or auger 231 and are conveyed to the rotor 237 where they are threshed a second time.

Threshed and separated straw is discharged from the rotary threshing and separating assembly 224 through an outlet 232 by a discharge beater 234. The discharge beater 234, in turn, propels the straw out the rear of the combine. It should be noted that the discharge beater 234 could also discharge crop material other than grain directly to a straw chopper. The operation of the combine is controlled from an operator's cab 235.

An operator's console 250 located in the cab 235 includes conventional operator controls including a hydro shift lever 252 for manually controlling the speed range and output speed of the hydrostatic transmission. An operator interface device 254 in the cab 235 allows entry of information into a controller 255 comprising an on-board processor system, which provides automatic speed control and numerous other control functions described below for the harvester 200. The operator can enter various types of information into the operator interface device 254, including crop type, location, yield and the like. In the example illustrated, combine harvester 200 additionally comprises display 257 for presenting information to the operator. In some implementations, display 257 may additionally serve as an input device, such as when display 257 comprises a touch screen. In other implementations, display 257 may be combined with interface device 254.

As further shown by FIG. 3, harvester 200 additionally comprises roll sensor 260, pitch sensor 262, crop flow sensors 264, 266 and controller 270. Roll sensor 260 senses and detects the roll of harvester 200 as it is traversing a growing medium or field. Pitch sensor 262 senses and detects a current pitch of harvester 200 as it is traversing a growing medium or field. The detected roll and pitch of harvester 200 is to controller 270 for the automated adjustment of the orientation of pan 227 of cleaning system 226. In some implementations, signals from sensors 260, 262 may be additionally utilized by controller 270 to adjust the orientation of other separation pans, such as chaffer 228 and/or sieve 229.

Crop flow sensors 264, 266 sense a uniformity or levelness of the flow of crop. In one implementation, crop flow sensors 264, 266 may comprise photodetectors or cameras. In one implementation, crop flow sensor 264, 266 may comprise sensors that form an electromagnetic plane through which the crop material flows. Examples of such sensors are found in co-pending U.S. patent application Ser. No. 15/844,523 filed on the same day here with by Dybro et al and entitled HARVESTER WITH ELECTROMAGNETIC PLANE CROP MATERIAL FLOW SENSOR, the full disclosure of which is hereby incorporated by reference.

Crop sensor 264 is located between concave 225 and pan 227, wherein sensor 264 output signals indicating the uniformity or lack thereof with respect to the flow of crop material from concave 225 onto pan 227. In one implementation, sensor 264 may output signals indicating an extent to which the flow of grain and chaff from concave 225 is heavier or greater in a front portion or a rear portion of pan 227, such as when harvester 200 may be going uphill or downhill. In one implementation, sensor 264 may output signals indicating an extent to which the flow of grain and chaff from concave 225 is heavier greater to one transverse side of pan 227, the leftward portions or rightward portions of pan 227, such as when harvester 200 may be going along the side of a hill. In some implementations, sensor 264 may output singles indicating nonuniform crop flow in both fore-aft and transverse directions.

Crop flow sensor 266 is similar to crop flow sensor 264 to the crop flow sensor 266 is located between pan 266 and chaffer 228. Crop flow sensor 266 outputs signals indicating an extent to which the flow of grain and chaff from pan 226 is heavier or greater in a front portion or a rear portion of chaffer 228, such as when harvester 200 may be going uphill or downhill. In one implementation, sensor 264 may output signals indicating an extent to which the flow of grain and chaff from pan 226 is heavier greater to one transverse side of chaffer 228, the leftward portions or rightward portions of chaffer 228, such as when harvester 200 may be going along the side of a hill. In some implementations, sensor 266 may output singles indicating nonuniform crop flow in both fore-aft and transverse directions.

Controller 270 comprises software, code, circuitry and/or program logic providing instructions for a processor to adjust operational settings or parameters of harvester 200 based upon various signals or inputs from sensors of harvester 200 and based upon commands from an operator of harvester 200. In the example illustrated, controller 270 outputs control signals that cause the orientation of pan 266 to be adjusted independent of the orientation of chaffer 228 and/or sieve 229 and without altering a reciprocation stroke distance of pan 227. In one implementation, controller 270 outputs such control signals based upon orientation adjustment commands received from an operator, such as from an operator within cab 235 using interface 254. In one implementation, controller 270 output such control signals automatically in response to signals from sensors 260, 262, 264 and/or 266. In some implementations, controller 270 may output control signals controlling the orientation of pan 227 based upon additional factors such as based upon signals indicating the amount or volume of crop flow, the current or momentary determined grain yield, sensed moisture of the crop, parameters of rotary threshing and separating assembly 224 (such as the concave spacings), the translational speed at which harvester 200 is traversing a field and the like.

Figure 4:
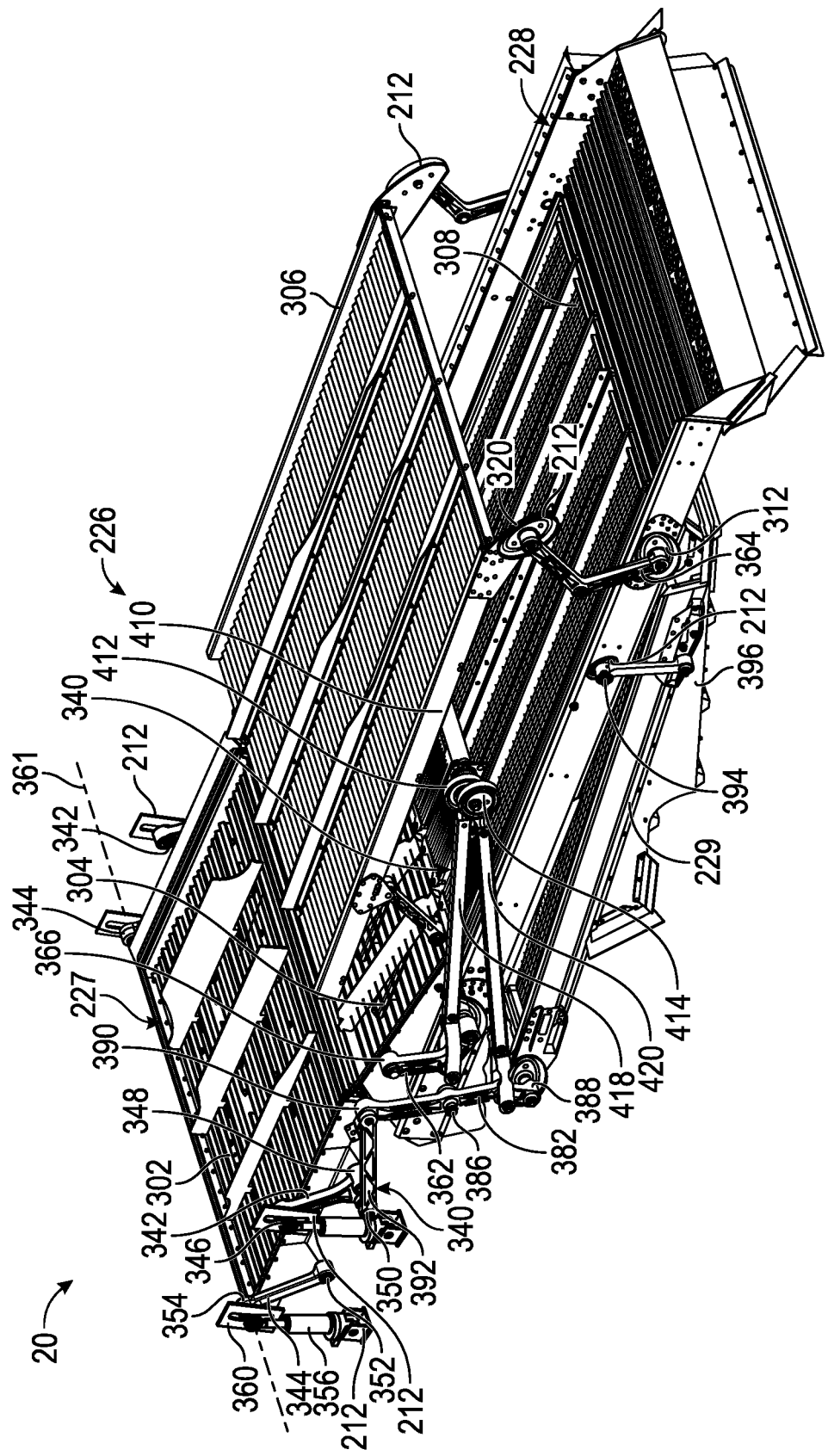
FIG. 4 is a left side rear perspective view of portions of an example cleaning system of the example harvester of FIG. 3.
Figure 5:
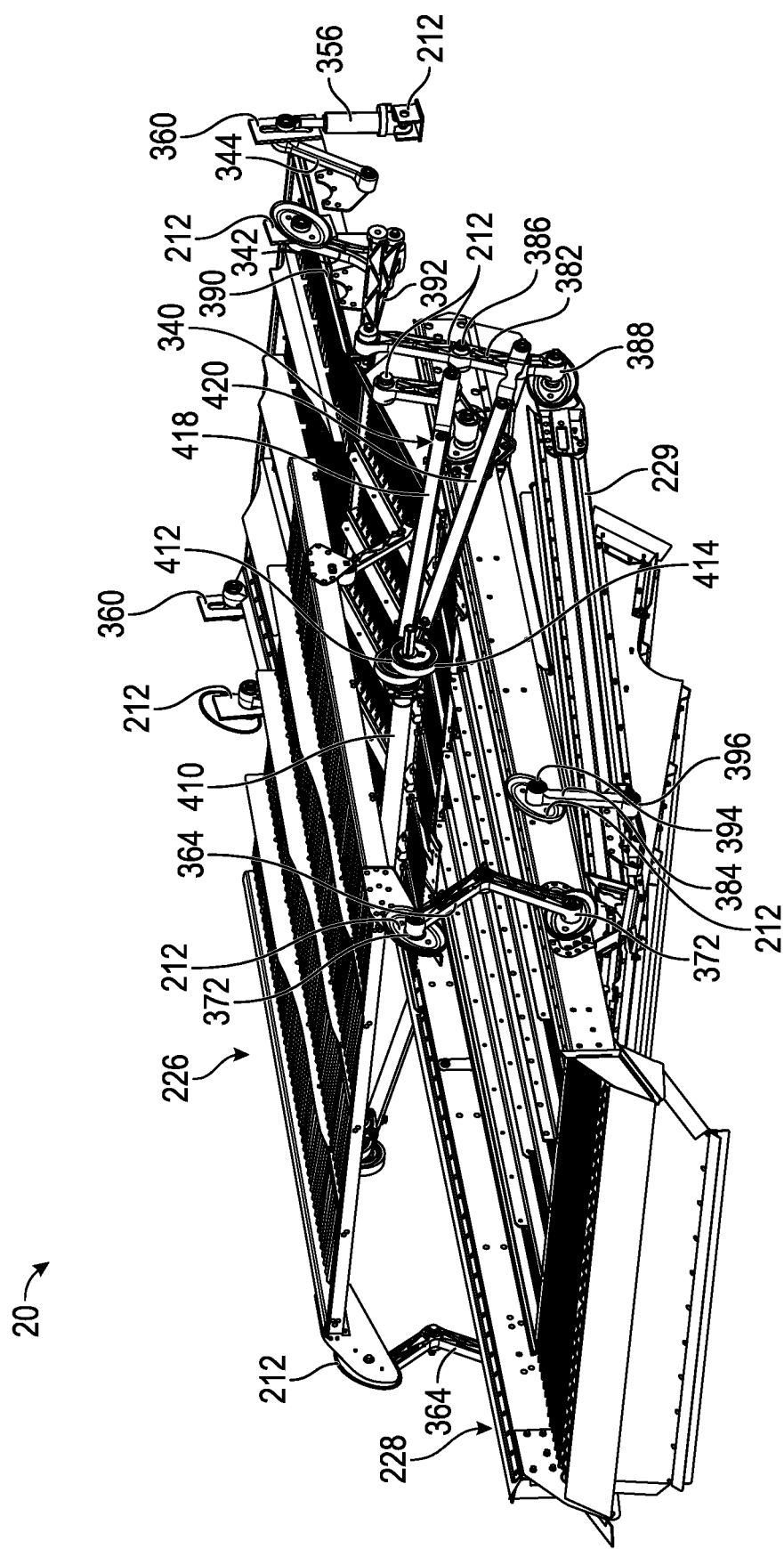
FIG. 5 is a right side rear perspective view of portions of the cleaning system of FIG. 4.

FIGS. 4 and 5 illustrate cleaning system 226 of harvester 20 in greater detail. As shown by FIGS. 4 and 5, step pan 227 comprise a separation frame having an imperforate floor 302 upon which crop material, grain and chaff, is deposited after falling from concave 225 (shown in FIG. 3). Step pan 227 transitions downward to chaffer 228 across an upper chaffer 304. Upper chaffer 304 extend rearwardly from pan 227 and includes perforations or openings through which air from below are 230 may pass, blowing the lighter chaff rearward.

Chaffer 228 comprise a separation frame that receives crop material that has passed across step pan 227 and upper chaffer 304. Chaffer 228 may additionally receive crop material that is passed through an overhead chaffer 306 which also receives crop material from rearward portion of concave 225. Chaffer 228 is movably supported by chassis 212 (shown in FIG. 3) so as to be reciprocated. Chassis 228 has a floor formed from multiple louvers 308 which are spaced so as to filter grain from chaff of a first predetermined size. In one implementation, the louvers each have an orientation that is adjustable relative to the main frame of chaffer 228.

Sieve 229 comprises a separation frame below chaffer 228 that receives crop material that is passed through chaffer 228. Sieve 229 has filtering elements, in the form of louvers, which are spaced so as to filter grain from chaff of a second predetermined size smaller than the first predetermined size. In one implementation, the louvers of sieve 229 each have an orientation that is adjustable relative to the main frame of sieve 229.

As further shown by FIGS. 4 and 5, step pan 227, chaffer 228 and sieve 229 are each movably supported by chassis 212 to facilitate reciprocation by reciprocating drive 340. Step pan 227 is hung with respect to chassis 212 by a pair of step pan drive swingers 342 and by a pair of step pan driven swingers 344. Drive swingers 342 each have a first portion 346 pivotally coupled to chassis 212, a second portion 348 pivotably connected to step pan 227 by a third portion 350 connected to reciprocating drive 340. Driven swingers 344 each have a first portion 352 pivotally connected to step pan 227 and a second portion 354 pivotally connected to an adjustable link 356 that is connected to chassis 212. In the example illustrated, link 356 is pivotably connected to chassis 212 and is pivotably connected to portion 354 of driven swinger 346 about a joint which is guided by a pivot guide 360. In the example illustrated, pivot guides 360 comprise plates or other structures secured to or provided by chassis 212, wherein the structures have arcuate slots along which portions 346 and the end of swinger 344 are guided as adjustable link 356 is extended and retracted.

Adjustable link 356 is adjustable between a multitude of different lengths so as to reposition the pivot axis 361 and by chaffer driven swinger 364. From which pan 227 is hung and about which pan 227 pivots during reciprocation along an arcuate path. In the example illustrated, each adjustable link 356 comprises a hydraulic cylinder-piston assembly which is selectively extendable and retractable in response to control signals from controller 270 (shown and described above with respect to FIG. 3). Extension and retraction of the adjustable link 356 alters the fore-aft orientation of pan 227 relative to chassis 228 and sieve 29. Extension and retraction of the adjustable link 356 just the orientation of step pan 227 without altering a reciprocation stroke of pan 227, the distance that pan 227 travels during reciprocation.

Chaffer 228 is pivotably hung from chassis 212 by chaffer drive swingers 362 and by chaffer driven swingers 364. Each chaffer drive swinger 362 has a first portion 366 pivotably coupled to chassis 212 at and a second portion 368 (shown in FIG. 6) pivotably connected to chaffer 228. Each chaffer driven swinger 362 has a first portion 370 pivotably connected to chassis 212 and a second portion 372 pivotally connected to chassis 228.

Sieve 229 is pivotally hung from chassis 212 by sieve drive swingers 382 and by sieve driven swingers 384. Each sieve drive swinger 382 has a central portion 386 pivotably coupled to chassis 212, a portion 388 pivotably coupled to sieve 29 and an end portion 390 pivotably connected to a linkage 392 that is connected to portion 350 of step pan drive swinger. Each sieve driven swinger 384 has a first portion 394 pivotally connected to frame 212 and a second portion 396 pivotally connected to sieve 229.

Reciprocating drive 340 drives and reciprocates each of the separation frames, and 227, chaffer 228 and sieve 229. Reciprocating drive 340 comprises driveshaft 410, drive cams 412, 414, chaffer Pitman arm 418 and sieve Pitman arm 420. Driveshaft 410 comprises a shaft to connect to a source of torque, such as a hydraulic motor, electric motor or the like. Driveshaft 410 is fixed to drive cams 412 and 414 on opposite sides of cleaning system 20.

Drive cams 412 and 414 eccentrically connect Pitman arms 418 and 420, respectively, to driveshaft 410 such that rotation of driveshaft 410 reciprocates Pitman arms 418 and 420. Each chaffer Pitman arm 418 extends into pivotal connection with its corresponding chaffer drive swinger 362. Each sieve Pitman arm 420 extends into pivotal connection with its corresponding sieve drive swinger 382.

Figure 6:
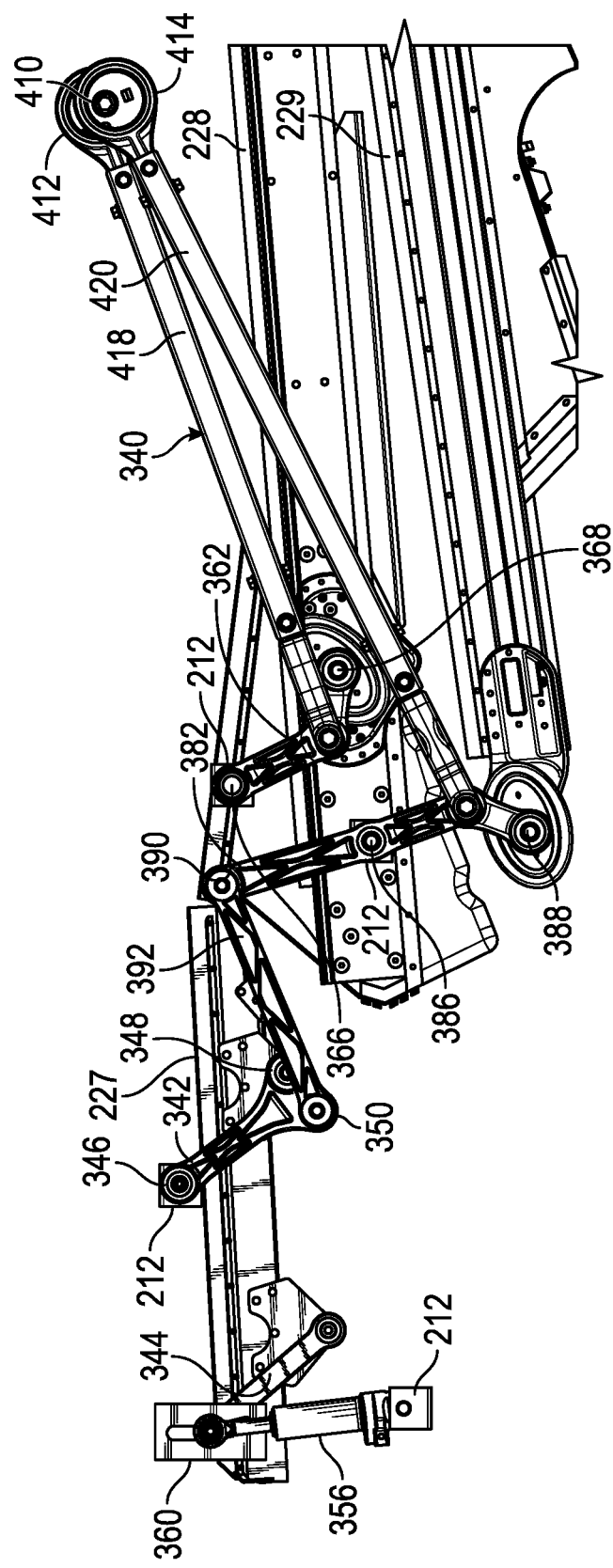
FIG. 6 is a side view of portions of the example cleaning system of FIG. 4 illustrating an example step pan of the cleaning system in a middle stroke position while being reciprocated
Figure 7:
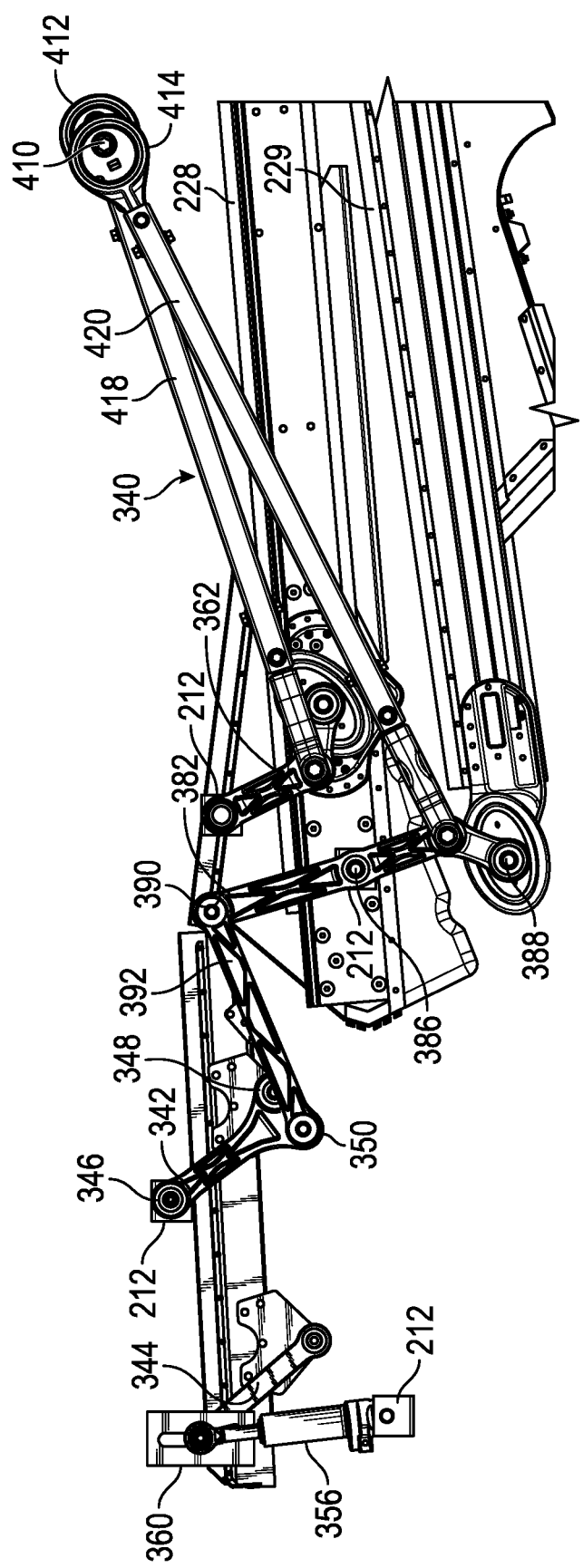
FIG. 7 is a side view of portions of the example cleaning system of FIG. 4 illustrating the example step pan of the cleaning system in a top stroke position while being reciprocated.
Figure 8:
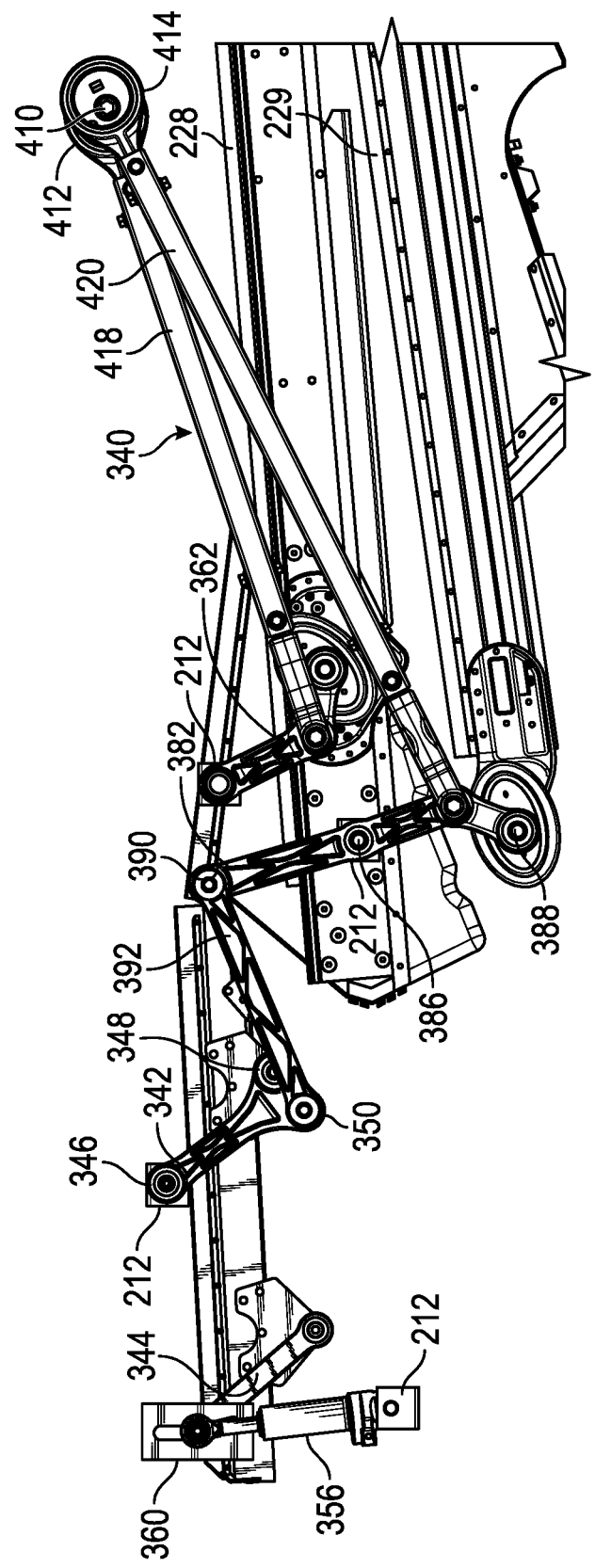
FIG. 8 is a side view of portions of the example cleaning system of FIG. 4 illustrating the example step pan of the cleaning system in a bottom stroke position while being reciprocated.

FIGS. 6-8 illustrate portions of a cycle of reciprocating drive 340 during the reciprocation of step pan 227, chaffer 228 and sieve 229. FIG. 6 illustrates reciprocating drive 340 when step pan 227 is level and is at a middle stroke position. FIG. 7 illustrates reciprocating drive 340 when step pan 227 is level and is as at a top stroke position. FIG. 8 illustrates reciprocating drive 340 when step pan 227 is level and is at a bottom stroke position.

Figure 9:
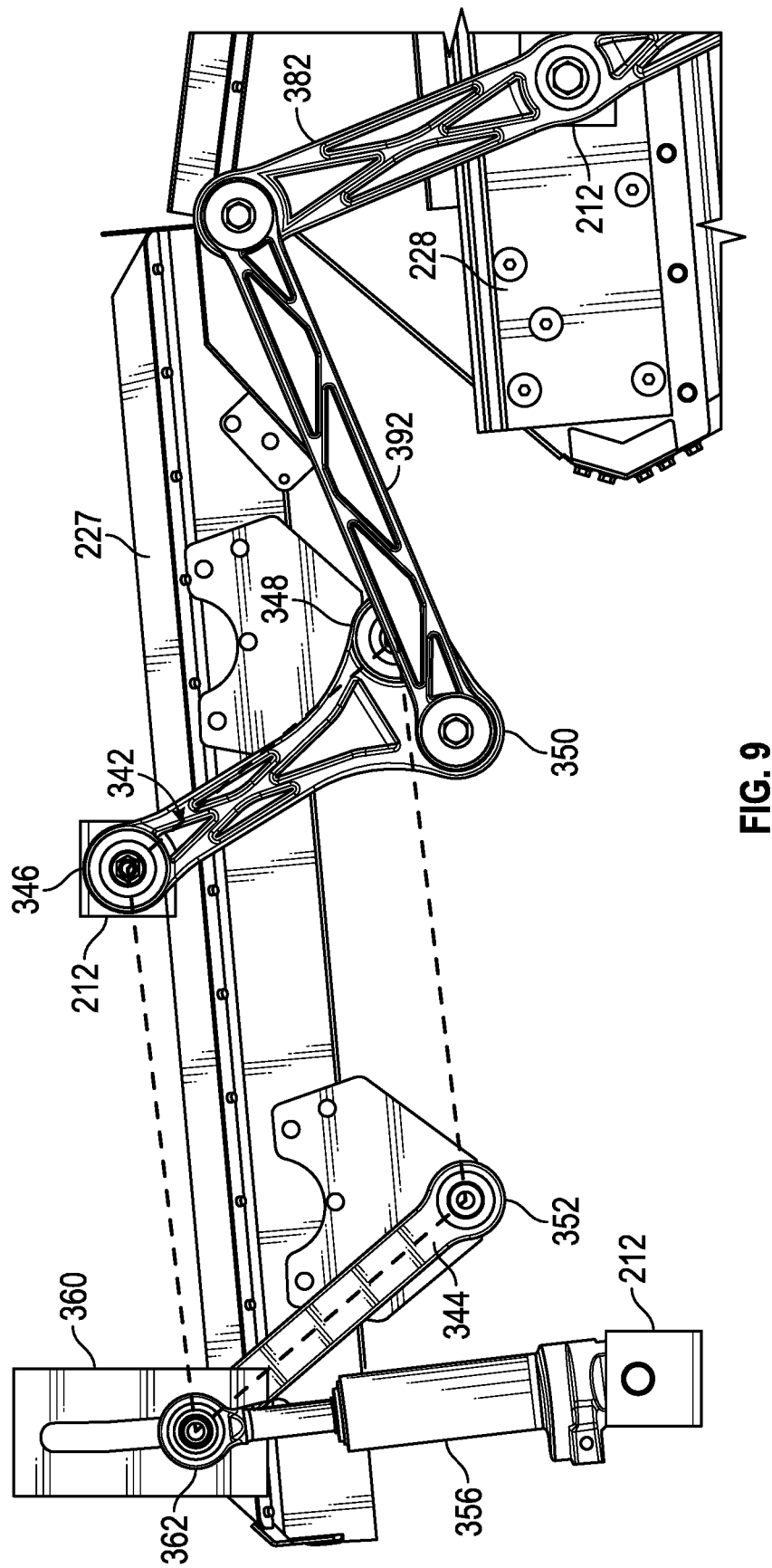
FIG. 9 is a side view of portions of the example cleaning system of FIG. 4 illustrating the example step pan in a forwardly tilted orientation.
Figure 10:
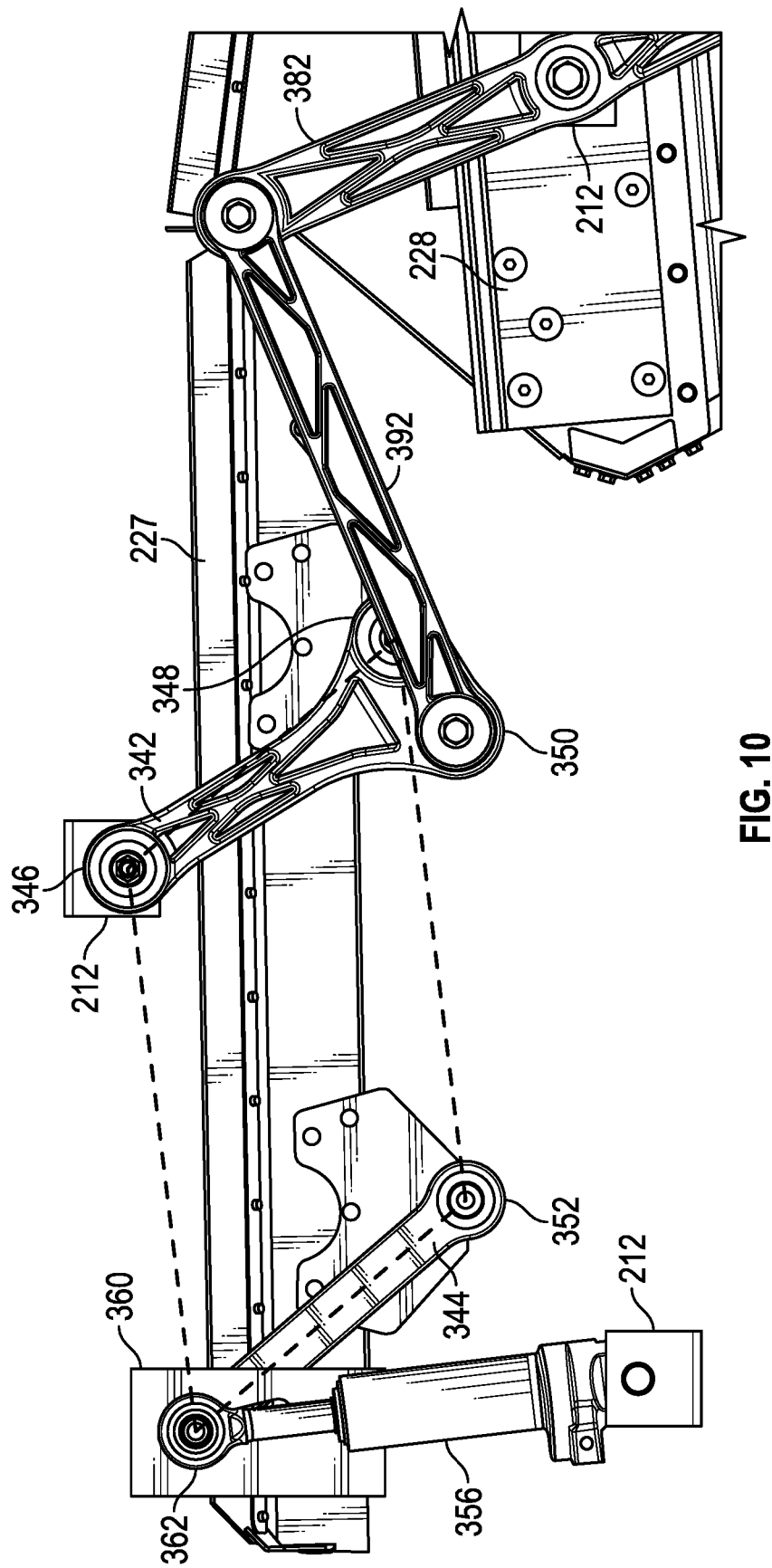
FIG. 10 is a side view of portions of the example cleaning system of FIG. 4 illustrating the example step pan in a rearwardly tilted orientation.

FIGS. 9 and 10 illustrate adjustment of the orientation of step pan 227 through the adjustment of the length of adjustable links 356. As shown by the broken lines of FIGS. 9 and 10, chassis 212, pan 227, step pan drive swinger 342 and step pan driven swinger 344 form a four bar linkage that maintains the orientation of pan 227 as pan 227 is being reciprocated by reciprocating drive 340. The orientation of pan 227 may be established by the location of the pivot axis 362. FIG. 9 illustrates link 356 in a shortened state. As a result, axis 362 about which the front end of pan 227 hangs and pivots during reciprocation is in a lowered state. Pan 227 has an orientation tilted forwardly relative to chaffer 228. The reciprocation distance of pan 227 (shown in FIGS. 6-8) does not change. In one implementation, in response to receiving signals from sensor 260 indicating that harvester 200 is going uphill and/or receiving signals from sensors 264, 266 indicating an uneven crop loading of the front and rear portions of pan 227, controller 270 (shown in FIG. 3) may output control signals that cause adjustable links 356 to actuate to the shortened state.

FIG. 10 illustrates link 356 in an extended state. As a result, axis 362 about which the front end of pan 227 hangs and pivots during reciprocation is in a lowered state. Pan 227 has an orientation tilted forwardly relative to chaffer 228. The reciprocation distance of pan 227 (shown in FIGS. 6-8) does not change. In one implementation, in response to receiving signals from sensor 260 indicating that harvester 200 is going downhill and/or receiving signals from sensors 264, 266 indicating an uneven crop loading of the front and rear portions of pan 227, controller 270 (shown in FIG. 3) may output control signals that cause adjustable links 356 to actuate to the extended state. As should be appreciated, controller 270 may output control signals causing adjustable link 356 to have any of a continuum of different links between the shortened state shown in FIG. 9 and the extended state shown in FIG. 10 depending upon or based upon the extent to which the harvester 20 has a non-level orientation or the extent to which crop is being un-evenly loaded upon pan 227.

Figure 11:
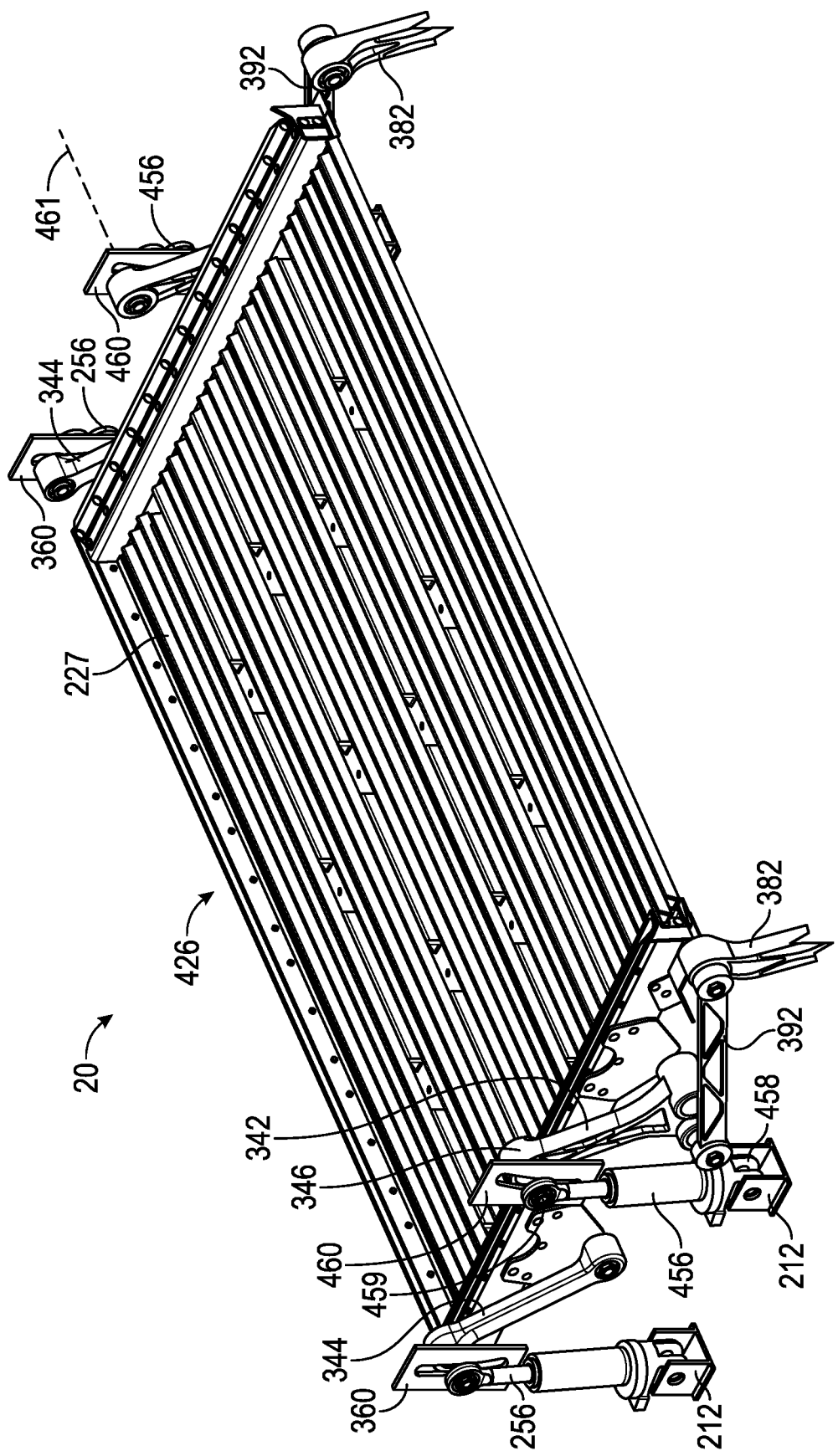
FIG. 11 is a top perspective view of portions of another example cleaning system of the harvester of FIG. 3.

FIG. 11 is a top perspective view of portions of another example cleaning system 426 of harvester 20. Cleaning system 426 is similar to cleaning system 226 described above in all respects except that cleaning system 426 additionally comprises adjustable links 456. Those remaining components of cleaning system 426 which correspond to components of cleaning system 226 shown in FIG. 11 are numbered similarly or are shown in FIGS. 4-10.

Adjustable links 456 cooperate with adjustable links 256 to additionally facilitate adjustment of a transverse orientation of pan 227. Each adjustment link 456 has a first end portion 458 pivotably connected to a bracket of chassis 212 and a second end portion 459 pivotably connected to and portion 346 of step pan drive swinger 342. End portion 346 of step pan drive singer 342 is not directly pivotably connected to chassis 212, but is pivotably coupled to chassis 212 by adjustable link 456. The connection between and portion 346 and portion 460 of adjustable link 456 forms a pivot axis 461 about which swinger 342 pivots relative to chassis 212. In the example illustrated, extension and retraction of links 456 is guided by pivot guides 460 which, like pivot guides 360, comprise plates or other structures secured to or provided by chassis 212, wherein the structures have arcuate slots along which portions 346 and 459 slide and are guided as adjustable link 456 is extended and retracted.

In the example illustrated, adjustable links 456 are similar to adjustable links 256 in that adjustable links 456 comprise hydraulic cylinder-piston assemblies that may be extended and retracted in response to electrical control signals from controller 270 (shown in FIG. 3). In other implementations, adjustable links 456 may comprise pneumatic cylinder-piston assemblies, electric solenoid or other linear actuators having adjustable links. In some implementations, adjustable links 256 and/or adjustable links 456 may comprise telescopic links or other links having links with your adjusted by separate actuators that are operably coupled to such links.

Figure 12:
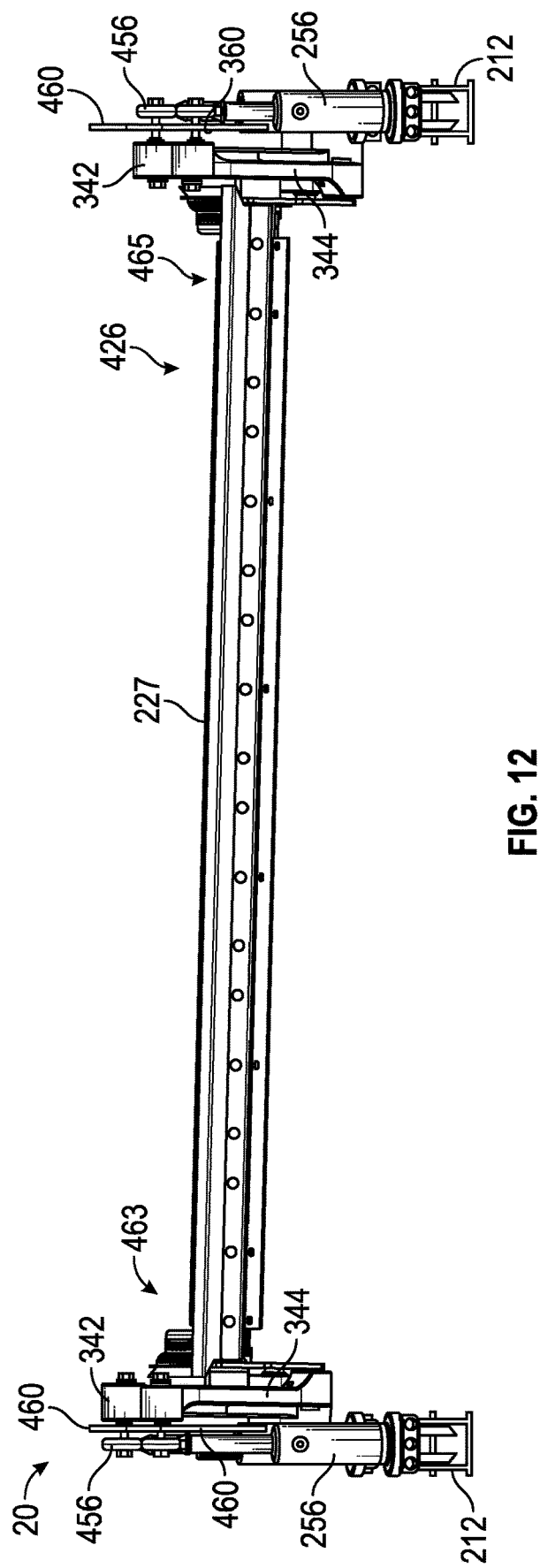
FIG. 12 is a front view of the portions of the example cleaning system of FIG. 11 illustrating the example step pan in a rightward leaning orientation.

FIG. 12 is a front view of cleaning system 426 illustrating pan 227 having an orientation which pan 227 is tilted downward to the right (as seen in FIG. 12) relative to chassis 212 and relative to chaffer 228 (shown in FIG. 5) by links 256, 456 in response to control signals from controller 270 (shown in FIG. 3). In response to receiving signals from sensor 262 and/or from one or both of sensor 264, 266 indicating that harvester 20 is traversing a side of a hill with the right side of the harvester being higher than the left side of the harvester and/or indicating an uneven crop flow with a greater crop flow onto the left side 463 of pan 227 as compared to the right side 465 of pan 227, controller 270 may output control signals causing links 256 and 456 on the left side of pan 227 to move to an extended state or lengthen state relative to the retracted or shorter state of links 256 and 456 on the right side of pan 227. As shown by FIG. 12, this results in pan 227 being tilted downwardly to the right relative to chassis 212 to accommodate the electrically downward incline of chassis 212 and the larger crop amount being deposited upon the left side 463 of pan 227.

In some circumstances, the orientation of pan 227 may be concurrently adjusted in two dimensions, such as when harvester 20 years tilted in the fore-aft direction going up or down a hill and is also tilted transversely such as when traveling across a side of the hill. In such an implementation, the four individual links 256 and 456 may be independently adjusted to different lengths in response to signals from controller 270. For example, links 256 may be both set at a fully extended position, link 456 on the left side of pan 227 may be set at an intermediate position and link 456 on the right side of pan 227 may be set at a fully retracted or shortened position such that pan 227 tilts rearwardly and to the right. Other combinations of settings, depending upon signals from sensors 260, 262, 264 and 266 may be achieved by signals from controller 270.

Figure 13:
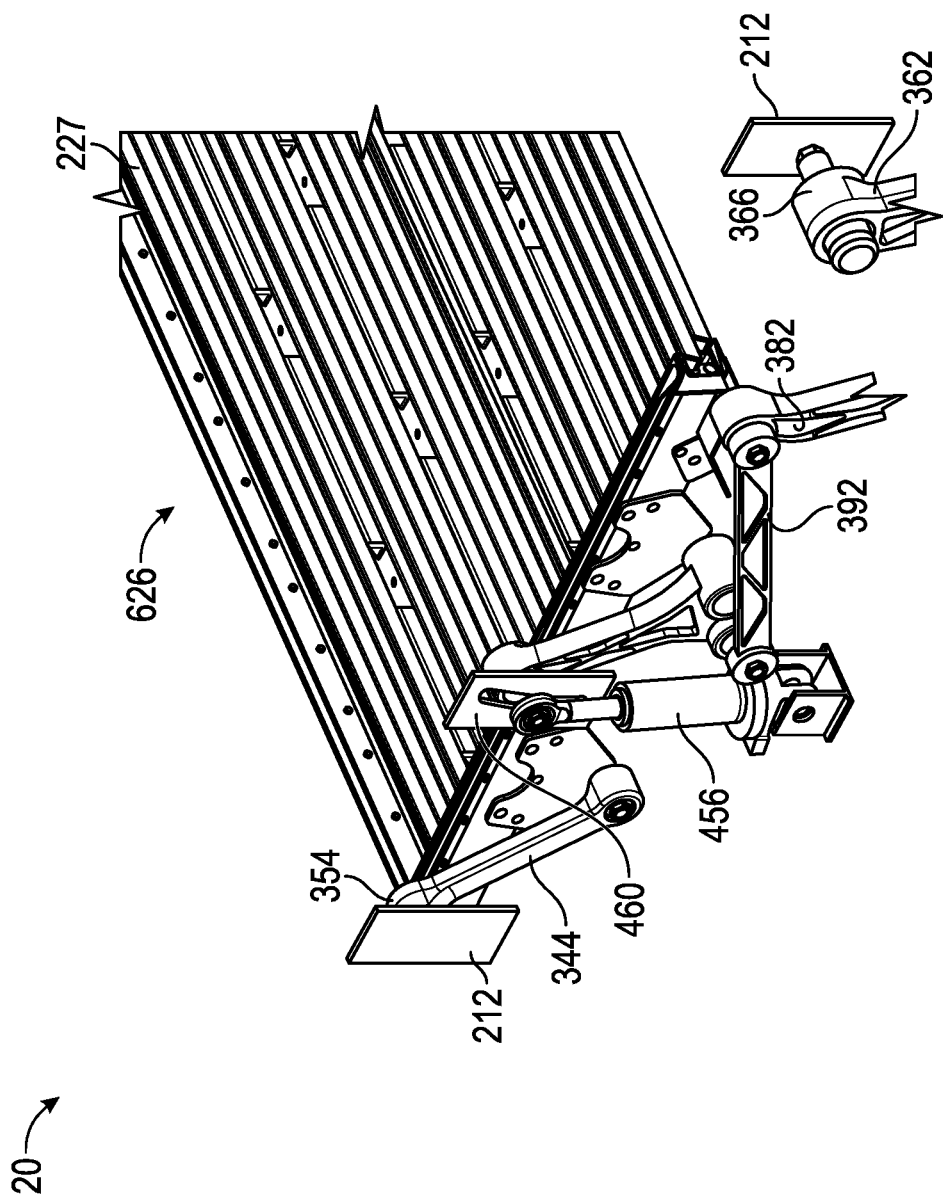
FIG. 13 is a perspective view of one side of portions of another example cleaning system of the harvester of FIG. 3.

FIG. 13 illustrates one side of another example cleaning system 626 that may be provided as part of harvester 20. The other side of cleaning system 626 is similar to the side being shown. Cleaning system 626 is similar to cleaning system 426 described above except that cleaning system 626 omits adjustable links 256, wherein portions 354 of driven swingers 344 are pivotably connected directly to chassis 212. Those remaining components of cleaning system 626 which correspond to components of cleaning system 426, and cleaning system 226, are numbered similarly. Likewise, those remaining components of harvester 20 not shown in FIG. 13 are illustrated in FIGS. 3-5. In the example illustrated, the orientation of pan 227 is controlled by adjusting the length of adjustable links 456.

Figure 14:
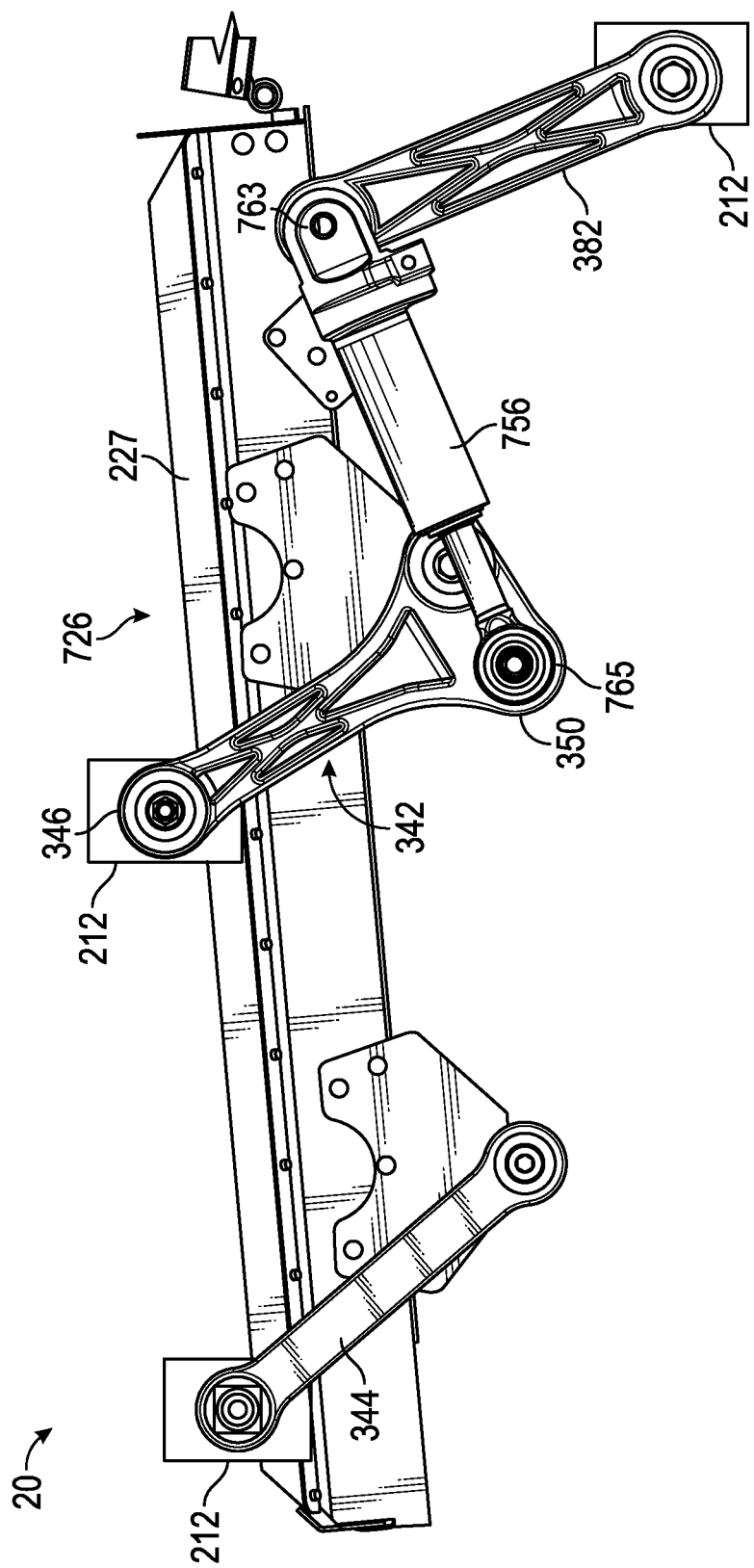
FIG. 14 is a side view of portions of another example cleaning system of the harvester of FIG. 3.

FIG. 14 illustrates one side of another example cleaning system 726 which may be provided as part of harvester 20. It should be appreciated that the other side of cleaning system 726 is similar to the side illustrated in FIG. 14. Cleaning system 726 is similar to cleaning system 626 except that cleaning system 726 omits adjustable links 456 and additionally comprises adjustable links 756 in place of link 392. Those remaining components of cleaning system 726 which correspond to components of cleaning system 626, and cleaning system 226, are numbered similarly. Likewise, those remaining components of harvester 20 not shown in FIG. 14 are illustrated in FIGS. 3-5.

As shown by FIG. 14, end portion 346 of each driven swinger 342 is pivotably connected directly to chassis 212. Similar to link 392, link 756 has a first end portion 763 pivotably connected to sieve drive swinger 382 and a second end portion 765 pivotably connected to portion 350 of step pan drive swinger 342. Unlike links 392, links 756 have an adjustable length similar to adjustable links 256 and 456 described above. In the example illustrated, adjustable links 756 comprise hydraulic cylinder-piston assemblies that may be extended and retracted in response to electrical control signals from controller 270 (shown in FIG. 3). In other implementations, adjustable links 756 may comprise pneumatic cylinder-piston assemblies, electric solenoid or other linear actuators having adjustable links.

Figure 15:
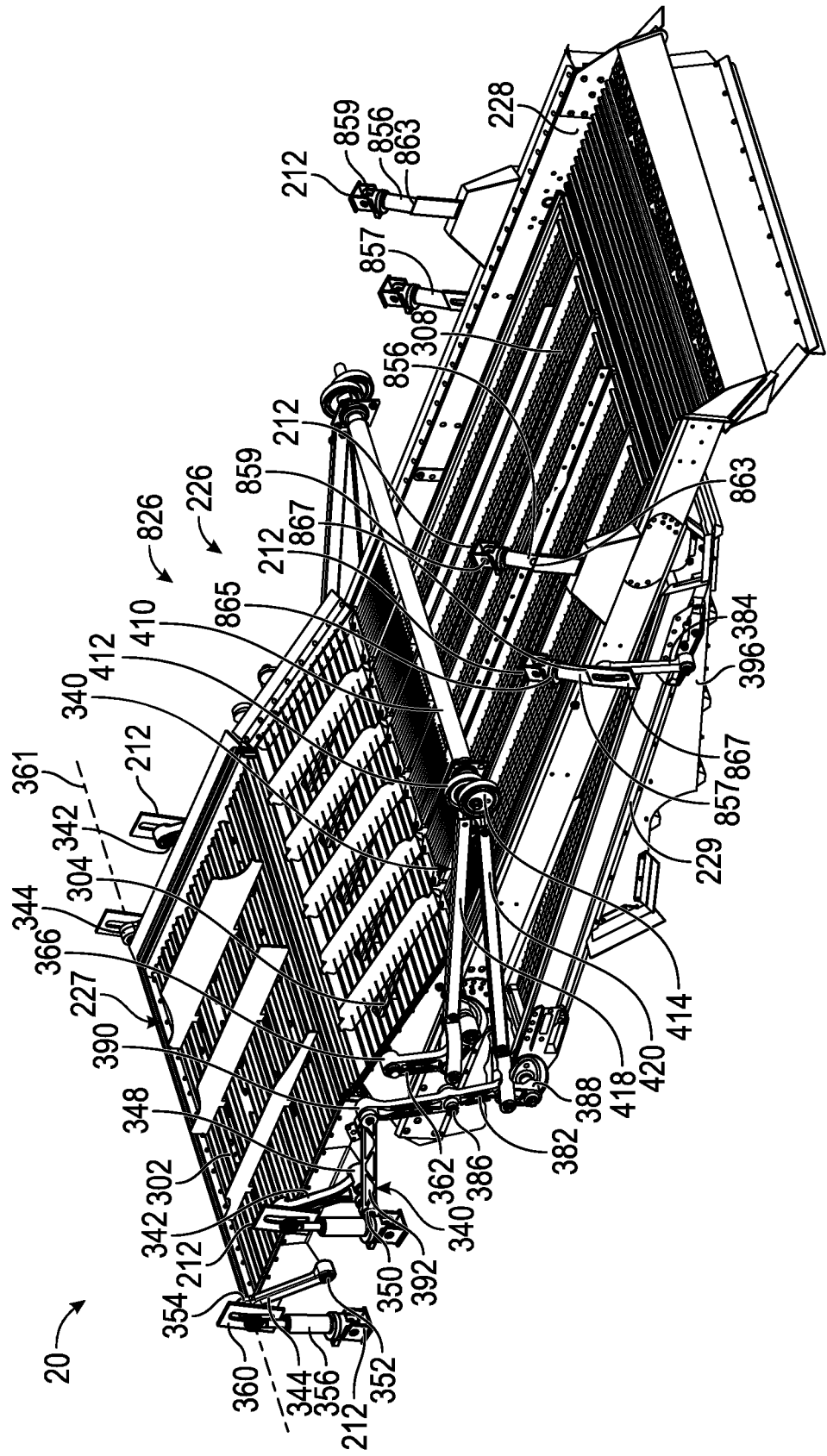
FIG. 15 is a perspective view of portions of another example cleaning system of the harvester of FIG. 3.

FIG. 15 illustrates portions of another example cleaning system 826 as part of an example harvester 20. Cleaning system 826 is similar to cleaning system 226 described above except that cleaning system 826 additionally comprises adjustable links 856 and adjustable links 857. Those remaining components of cleaning system 826 which correspond to components of cleaning system 226 are numbered similarly or are shown in FIGS. 4 and 5. Likewise, those remaining components of harvester 20 not shown in FIG. 13 are illustrated in FIGS. 3-5. For ease of illustration, chapter 306 is not shown in FIG. 15. In the example illustrated, cleaning system 826 facilitates adjustment of each of the individual orientations of step pan 227, chapter 228 and sieve 229 relative to one another and relative to chassis 227 without altering the reciprocation stroke distance of any of such separation frames.

Adjustable links 856 extend on opposite sides of chaffer 228. Adjustable links 856 are each similar to adjustable links 256 and/or adjustable links 456 as described above. Adjustable links 856 facilitate adjustment of the fore-aft orientation or tilting of chaffer 228. Each adjustable links 856 has a first end portion 859 pivotally connected to a bracket of chassis 212 and a second end portion 863 pivotally connected to chaffer 228. In the example illustrated, second end portion 863 is pivotably connected directly to chaffer 228. In other implementations, second end portion 863 may be pivotably connected to a driven swinger which is itself pivotally connected to chaffer 228.

The length of adjustable links 856 may be extended or retracted in response to control signals from controller 270 so as to adjust the forward or rearward incline or tilt of chaffer 228. For example, when going up a hill, adjustable links 856 may be adjusted to a shortened length, tilting chaffer 228 downwardly towards the front of the harvester 20 relative to the chassis 212 of harvester 20. When going downhill, adjustable links 856 may be adjusted to an extended length, tilting chaffer 228 downwardly towards the rear of the harvester 20, relative to the chassis 212 of harvester 20.

Adjustable links 857 extend on opposite sides of sieve 229. Adjustable links 857 are each similar to adjustable links 256 and/or adjustable links 456 as described above. Adjustable links 857 facilitate adjustment of the fore-aft orientation or tilting of sieve 229. Each of adjustable links 857 has a first end portion 865 pivotally connected to a bracket of chassis 212 and a second end portion 867 pivotally connected to driven sieve swinger 384 which is no longer pivotably connected directly to chassis 212. The pivot axis provided at the connection of end portion 867 and driven sieve swinger 384 is guided by pivot guide 867, which is similar to pivot guide 360 described above The length of adjustable links 856 may be extended or retracted in response to control signals from controller 270 so as to adjust the forward or rearward incline or tilt of chaffer 228. For example, when going up a hill, adjustable links 856 may be adjusted to a shortened length, tilting chaffer 228 downwardly towards the front of the harvester 20 relative to the chassis 212 of harvester 20. When going downhill, adjustable links 856 may be adjusted to an extended length, tilting chaffer 228 downwardly towards the rear of the harvester 20, relative to the chassis 212 of harvester 20.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester comprising:
   a chassis;
   a first separation frame movably supported by the chassis and upon which crop material is deposited;
   a second separation frame movably supported by the chassis and upon which the crop material is deposited;
   a reciprocating drive operably coupled to the first separation frame to reciprocate the first separation frame; and
   an adjustable link operably coupled between the first separation frame and the chassis to adjust an orientation of the first separation frame independent of an orientation of the second separation frame and without altering a reciprocation stroke distance.

2. The harvester of claim 1, wherein the first separation frame and the second separation frame are part of a cleaning shoe of the harvester.

3. The harvester of claim 1, wherein the first separation frame supports a step pan and wherein the second separation frame supports louvers.

4. The harvester of claim 1, wherein the adjustable link comprises a powered linear actuator.

5. The harvester of claim 1, wherein the powered linear actuator comprises a cylinder-piston assembly.

6. The harvester of claim 1, wherein the reciprocating drive comprises:
   a driven swinger having a first portion pivotably connected to a first portion of the first separation frame;
   the adjustable link, wherein the adjustable link has a first end pivotably connected to the chassis and a second end pivotably connected to a second portion of the driven swinger;
   a drive swinger having a first portion pivotally coupled to the chassis to pivot about a first pivot axis intersecting the drive swinger; a second portion pivotably connected to a second portion of the first separation frame to pivot about a second pivot axis intersecting the drive swinger; and a third portion to be pivotally coupled to a source of reciprocating motion to pivot about a third pivot axis intersecting the drive swinger.

7. The harvester of claim 6, wherein the reciprocating drive further comprises the source of reciprocating motion, wherein the source of reciprocating motion comprises:
   a drive shaft;
   a drive cam operably coupled to the drive shaft to be driven by the drive shaft; and
   a Pitman arm operably coupled between the drive cam and the drive swinger.

8. The harvester of claim 7, wherein the first separation frame supports louvers.

9. The harvester of claim 7, wherein the first separation frame supports a step pan and the second separation frame supports louvers, the reciprocating drive further comprising:
   a second drive swinger having a first portion pivotably coupled to the second separation frame and a second portion pivotably connected to the chassis;
   a linkage having a first portion pivotally connected to the third portion of the drive swinger and a second portion pivotally connected to a third portion of the second drive swinger.

10. The harvester of claim 9 further comprising:
    a second driven swinger having a first portion pivotably connected to the second separation frame; and
    a second adjustable link having a first portion pivotably connected to the chassis and a second portion pivotably connected to a second portion of the second driven swinger.

11. The harvester of claim 10 further comprising:
    a third separation frame, the third separation frame supporting louvers;
    a third driven swinger having a first portion pivotably connected to a first portion of the third separation frame;
    a third adjustable link, the third adjustable link having a first end pivotably connected to the chassis and a second end pivotably connected to a second portion of the third driven swinger;
    a third drive swinger having a first portion pivotably coupled to the chassis; a second portion pivotably connected to a second portion of the third separation frame; and a third portion to be pivotally coupled to a second source of reciprocating motion.

12. The harvester of claim 11, wherein the second source of reciprocating motion comprises:
    the drive shaft;
    a second drive cam operably coupled to the drive shaft to be driven by the drive shaft; and
    a second Pitman arm operably coupled between the second drive cam and the third drive swinger.

13. The harvester of claim 7, wherein the second separation frame supports louvers, the harvester further comprising:
    a second driven swinger having a first portion pivotably connected to a first portion of the second separation frame;
    a second adjustable link, the second adjustable link having a first end pivotably connected to the chassis and a second end pivotably connected to a second portion of the second driven swinger;
    a second drive swinger having a first portion pivotably coupled to the chassis to pivot about a first pivot axis intersecting the second drive swinger; a second portion pivotably connected to a second portion of the second separation frame to pivot about a second pivot axis intersecting the second drive swinger; and a third portion to be pivotally coupled to a second source of reciprocating motion to pivot about a third pivot axis intersecting the second drive swinger.

14. The harvester of claim 13, wherein the second source of reciprocating motion comprises:
    the drive shaft;
    a second drive cam operably coupled to the drive shaft to be driven by the drive shaft; and
    a second Pitman arm operably coupled between the second drive cam and the second drive swinger.

15. The harvester of claim 6 further comprising a pivot guide to guide translation of a pivot connection between the driven swinger and the adjustable link.

16. The harvester of claim 6, wherein the reciprocating drive comprises:

a second driven swinger having a first portion pivotably connected to a third portion of the first separation frame;

a second drive swinger comprising:
a first portion pivotally coupled to the chassis;
a second portion pivotably connected to a second portion of the first separation frame; and
a third portion to be pivotally coupled to the source of reciprocating motion;

a second adjustable link having a first end pivotally connected to the chassis and a second end pivotally connected to a second portion of the second driven swinger;

a third adjustable link having a first end pivotally connected to the chassis and a second end pivotally connected to the first portion of the drive swinger; and a fourth adjustable link having a first end pivotally connected to the chassis and a second end pivotally connected to the first portion of the second drive swinger.

17. The harvester of claim 1, wherein the reciprocating drive comprises:

drive swinger comprising:
a first portion pivotally coupled to the chassis to pivot about a first pivot axis intersecting the drive swinger;
a second portion pivotably connected to a portion of the first separation frame to pivot about a second pivot axis intersecting the drive swinger; and
the adjustable link, wherein the adjustable link has a first end pivotally coupled to a third portion of the drive swinger to pivot about a third pivot axis intersecting the drive swinger and a second end to be pivotally coupled to a source of reciprocating motion.

18. The harvester of claim 1, wherein the reciprocating drive comprises:
a driven swinger having a first portion pivotably connected to the chassis and a second portion pivotably connected to the first separation frame;
a drive swinger having a first portion pivotally coupled to the chassis to pivot about a first pivot axis intersecting the drive swinger; a second portion pivotably connected to a second portion of the first separation frame to pivot about a second pivot axis intersecting the drive swinger; and a third portion to be pivotally coupled to a source of reciprocating motion to pivot about a third pivot axis intersecting the drive swinger; and
the adjustable link, wherein the adjustable link has a first end pivotably connected to the chassis and a second end pivotably connected to the first portion of the drive swinger.

19. The harvester of claim 1 further comprising:
a sensor to sense uneven grain flow onto the separation frame; and
a controller to automatically output control signals, based upon signals from the sensor, to adjust a length of the adjustable link and an orientation of the first separation frame.

20. The harvester of claim 1 further comprising:
a sensor to sense an orientation of at least portions of the harvester; and
a controller to automatically output control signals, based upon signals from the sensor, to adjust a length of the adjustable link and an orientation of the first separation frame.

* * * * *